US012782493B2

(12) United States Patent
Reddy et al.

(10) Patent No.: US 12,782,493 B2
(45) Date of Patent: Nov. 3, 2026

(54) ANCHOR NODE LOCATION DISSEMINATION

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 18/452,995

(22) Filed: Aug. 21, 2023

(65) Prior Publication Data

US 2025/0067834 A1 Feb. 27, 2025

(51) Int. Cl.
*G01S 5/02* (2010.01)
*H04W 64/00* (2009.01)

(52) U.S. Cl.
CPC ......... *G01S 5/0284* (2013.01); *H04W 64/003* (2013.01)

(58) Field of Classification Search
CPC .... G01S 5/0284; G01S 1/042; G01S 5/02955; G01S 5/0226; G01S 5/0236; G01S 5/0045; G01S 5/10; G01S 1/0428; G01S 5/0036; G01S 5/0205; G01S 5/14; G01S 5/06; G01S 19/05; G01S 5/0242; G01S 5/0221; G01S 19/13; G01S 5/0252; G01S 11/06; G01S 5/011; G01S 5/013; G01S 19/42; G01S 1/024; G01S 1/026; G01S 1/08; G01S 1/753; G01S 5/0257; G01S 5/0295; G01S 19/07; G01S 11/026; H04W 64/003; H04W 64/00; H04W 72/23; H04W 4/029; H04W 4/02; H04W 64/006; H04W 72/0453; H04W 72/0446; H04W 48/12; H04W 4/025; H04W 4/023; H04W 88/08; H04W 56/0015; H04W 48/10; H04W 72/51; H04W 4/027; H04W 72/21; H04W 84/045; H04W 4/026; H04W 72/25; H04W 52/0229; H04W 56/0065; H04W 72/542; H04W 74/006; H04W 4/30; H04W 4/021;
(Continued)

(56) References Cited

U.S. PATENT DOCUMENTS

2010/0167758 A1* 7/2010 Mukai .................. H04W 64/00 455/456.2
2016/0242005 A1* 8/2016 Chen ..................... H04W 4/025
2023/0232363 A1 7/2023 Nam et al.

FOREIGN PATENT DOCUMENTS

CN 111239681 A 6/2020

OTHER PUBLICATIONS

International Search Report and Written Opinion—PCT/US2024/037705—ISA/EPO—Oct. 23, 2024.

* cited by examiner

*Primary Examiner* — Jing Gao
(74) *Attorney, Agent, or Firm* — Weaver Austin Villeneuve & Sampson LLP

(57) ABSTRACT

A method, for use in positioning a target mobile device, includes: transmitting, to the target mobile device from an apparatus, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

23 Claims, 12 Drawing Sheets

(58) Field of Classification Search

CPC ............ H04W 52/0209; H04W 48/04; H04W 36/083; H04W 36/249; H04W 36/322; H04W 52/365; H04W 56/006; H04W 72/0457; H04W 28/18; H04W 36/0072; H04W 4/33; H04W 56/0095; H04L 5/0048; H04L 5/0051; H04L 5/0053; H04L 5/0007; H04L 5/001; H04L 5/005; H04L 5/0023; H04L 27/261; H04L 1/02; H04L 1/04; H04L 1/06; H04L 5/22; H04L 27/2613; H04L 5/0005; H04L 5/0082; H04L 27/2675; H04L 27/2602; H04L 5/1469; H04L 5/0069

See application file for complete search history.

ANCHOR NODE LOCATION DISSEMINATION

DESCRIPTION OF RELATED ART

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Networks of devices may be used for various wireless signal transfer applications. For example, networks of devices may transmit positioning signals that may be measured to determine information from which position information (e.g., one or more ranges between a target device and one or more signal sources, a position estimate, etc.) may be determined. As another example, networks of devices may transmit signals containing data and/or communications.

SUMMARY

An example apparatus includes: at least one transceiver; at least one memory; and at least one processor, communicatively coupled to the at least one transceiver and the at least one memory, configured to transmit, via the at least one transceiver to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

An example method, for use in positioning a target mobile device, includes: transmitting, to the target mobile device from an apparatus, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

Another example apparatus includes: at least one transceiver; and means for transmitting, to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

An example non-transitory, processor-readable storage medium includes processor-readable instructions to cause at least one processor of an apparatus to: transmit, to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

DETAILED DESCRIPTION

Figure 1:
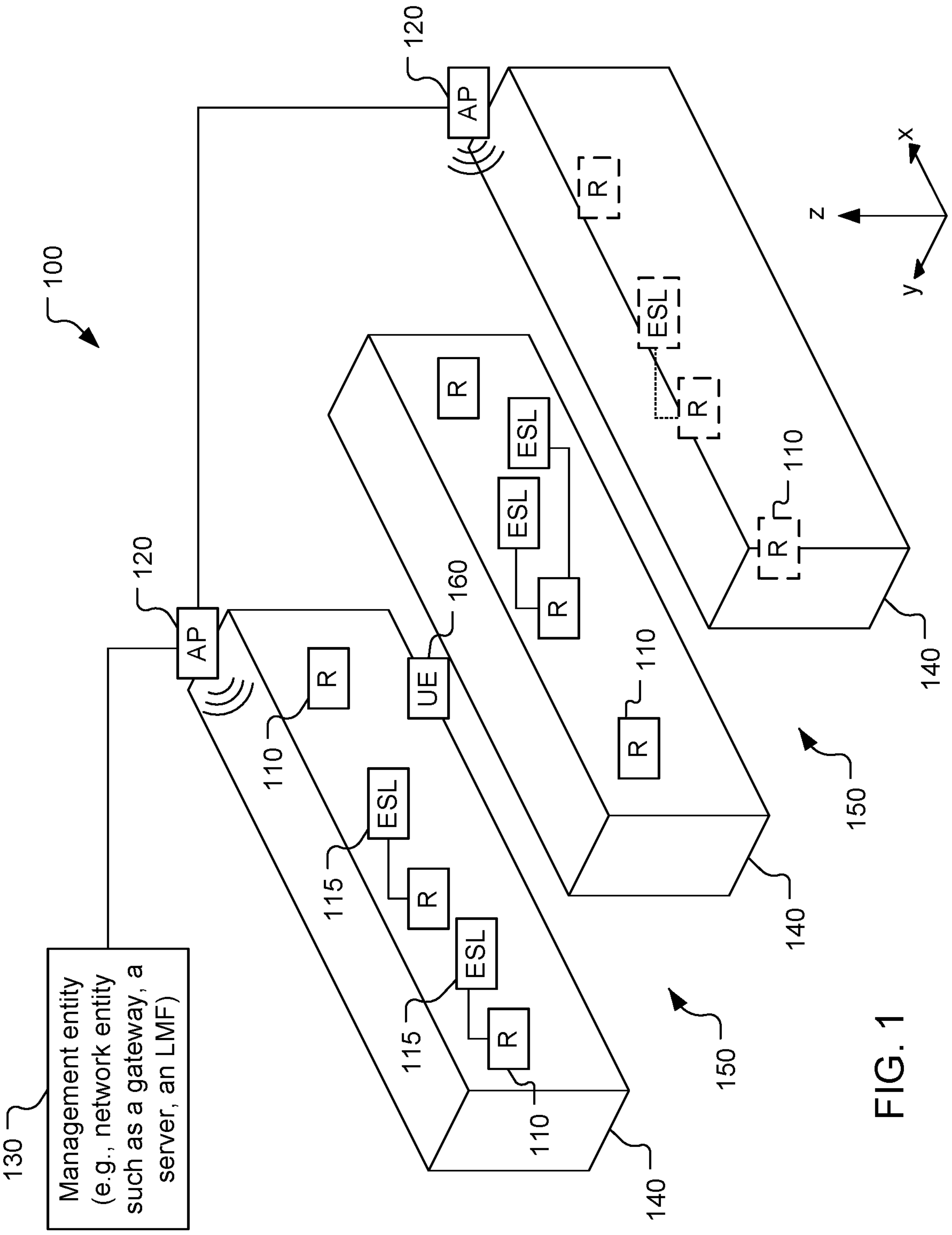
FIG. 1 is a perspective view of an example deployment of anchor wireless-signal transmitters.

Techniques are discussed herein for positioning a target mobile device in a dense anchor deployment. Locations of anchor nodes may be provided to a target mobile device by leveraging a topology of the deployment. For example, a reference location may be provided in full for a lead anchor node and locations of other (follower) anchor nodes may be indicated as offsets from the location of the lead anchor node. The offsets may be indicated as one or more distance offset increments for each of multiple time windows in which respective anchor nodes transmit respective beacon signals. Offset corrections may be provided, e.g., if a location offset of a follower anchor nodes changes. A subset of the anchor nodes in the deployment may be selected based on a coarse location of the target mobile device, which may reduce the signaling overhead for positioning the target mobile device by limiting the quantity of anchor nodes transmitting beacon signals for determining the location of the target mobile device. Other configurations, however, may be used.

Techniques are discussed for use with large-scale deployments, in which nodes may be inefficiently broadcasting their location. Location broadcasts may be reduced by taking into account physical features (e.g. layout of a warehouse/store), radio identifier, duty cycle of transmission and/or subset of preferred radios to be used for positioning. A physical region (e.g., with respect to a reference point such as an aisle, a shelf, etc.) may be used to define the radio ID (Identifier), so a user equipment (UE) may use the radio ID to determine location of the UE. A primary device may broadcast a location of the primary device and nearby devices may not provide their respective locations. Instead, for example, a time slot offset between the primary device and the nearby devices may correspond to a spatial relationship between the devices. The spatial relationship may be a horizontal offset, a vertical offset, a shelf offset, etc. There may be a "bubble" of a subset of radios that correspond to a coarse location of a primary device and the devices in the bubble may provide a beacon at a faster rate than devices outside the bubble. Location changes may be identified for an anchor location, and subsequent broadcast messages may include a correction factor for that anchor location. An anchor device may utilize a camera of the anchor device to periodically scan and identify non-uniform and/or altered spacing between other anchor devices. Based on a non-uniform and/or altered spacing being detected, a gateway can be notified. Electric Shelf Labels (ESLs) may be configured to transmit positioning reference signals at a certain periodicity and have offsets relative to other sets of ESL. A UE may receive assistance data for the UE to position with the ESLs.

Items and/or techniques described herein may provide one or more of the following capabilities, as well as other capabilities not mentioned. Signaling overhead for positioning a target mobile device may be reduced, e.g., relative to transmitting full locations of each anchor node in a deployment of anchor nodes. Regularity of topology of an anchor node deployment, e.g., a dense anchor node deployment, may be leveraged to reduce signaling overhead to convey locations of anchor nodes for positioning a target mobile device. Latency and power consumption and transmitters and receivers for positioning target mobile devices may be reduced, e.g., by reducing signaling overhead. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and/or access points. Various positioning methods may be used with wireless networks, e.g., positioning methods that use reference signals transmitted by signal sources (e.g., base stations and/or access points) in a manner similar to which LTE wireless networks utilize Positioning Reference Signals (PRS) and/or Cell-specific Reference Signals (CRS) for position determination.

Using a wireless network to convey signals, e.g., communication signals, positioning signals, and/or data signals may be very useful. One or more of such signals may serve multiple purposes, e.g., a communication signal may also be used as a positioning signal. Transmitting and receiving such signals has limitless applications.

Using a synchronized network may help with operation of a wireless network. For example, with synchronized signal transmissions from multiple access points, would-be recipients of the signal may be able to listen for the signal transmissions at specific times, over small windows of time, which may help conserve processing time and/or processing power to receive, measure, decode, and/or interpret the signal transmissions.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including appropriate claimed subject matter.

An electronic shelf label (ESL) system may include one or more ESLs that are controlled by a management entity. To facilitate control by the management entity, each ESL system may have a wireless connection (e.g., a BLUETOOTH® Low Energy (BLE) wireless communication protocol connection) from an ESL radio, of the ESL system, to an access point (AP) that is communicatively connected to the management entity (e.g., via a communication line, or via a network such as the Internet). Commands from the management entity may be wirelessly transmitted to the ESL system by the access point. An ESL system may include an ESL and one or more other devices (e.g., a radio (which may include a radio transmitter and/or a radio receiver as appropriate), a camera, etc.) that are physically separate from the ESL (e.g., an electronic display, a speaker, a camera, etc.).

Referring to FIG. 1, an example environment 100 includes an anchor-node deployment including ESL radios 110, access points 120, and a management entity 130. The management entity 130 may be communicatively coupled to the access points 120, e.g., via wired connections. The management entity 130 may be hosted in the cloud and accessed via a network, e.g., a personal area network (e.g., a Bluetooth® wireless communication protocol network) or other Local Area Network (LAN), and/or the Internet or another Wide Area Network (WAN). The access points 120 and the ESL radios 110 may be configured to communicate with each other wirelessly, e.g., using a short-range wireless protocol such as Bluetooth® wireless communication protocol or BLE (Bluetooth® Low Energy wireless communication protocol) and/or through another wireless protocol such as a cellular communication protocol, e.g., 5G NR (New Radio). In the example environment 100, the anchor nodes are ESL radios 110 with known locations. For example, each of the ESL radios 110 may know its own location and/or another entity (e.g., a management entity and/or a gateway (e.g., an edge server)) may know the locations of the ESL radios 110. At least some of the ESL radios 110 may be associated with one or more ESLs 115, although an ESL radio 110 may not be associated with any ESL. Also, one or more of the ESL radios 110 may each be associated with multiple ESLs 115. The ESL radios 110 may each include one or more transmitters and may each include one or more receivers, as discussed further below.

The access points 120 may include one or more devices capable of receiving, generating, storing, processing, providing, and/or routing information associated with access point synchronization and/or handover, as described herein. The access points 120 may include a communication device and/or a computing device. The access points 120 may be configured to transmit beacons (e.g., BLE beacons), as well as to scan for and locate other devices (e.g., other devices communicating using BLE protocols). Each of the access points 120 may provide a protocol translator to translate between Internet Protocol (IP) and a non-IP protocol.

The ESL radios 110 may each include one or more devices capable of receiving, generating, storing, processing, and/or providing information associated with access point synchronization and/or handover. Each of the radios 110 may include a communication device and/or a computing device. The radios 110 may each be, may each include, or may each be included in, an ESL.

The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. The management entity 130 may include computing hardware used in a cloud computing environment. The management entity 130 may provide control of a system (e.g., an ESL system) that includes the access points 120 and the radios 110.

The number and arrangement of devices and networks shown in FIG. 1 are provided as an example. In practice, there may be additional devices and/or networks, fewer devices and/or networks, different devices and/or networks, and/or differently arranged devices and/or networks than those shown in FIG. 1. Furthermore, two or more devices shown in FIG. 1 may be implemented within a single device, and/or one or more single devices shown in FIG. 1 may be implemented as multiple, distributed devices. Additionally, or alternatively, a set of devices (e.g., one or more devices) of the environment 100 may perform one or more functions described as being performed by another set of devices of the environment 100. While in the example shown in FIG. 1, the environment 100 includes nine ESL radios 110, the environment 100 may include a large-scale deployment of ESL radios, e.g., tens or even hundreds of ESL radios. For example, the environment 100 includes three shelving units 140 forming two aisles 150, and each of the shelving units 140 may include more than the three ESL radios 110 shown for each of the shelving units 140.

Figure 2:
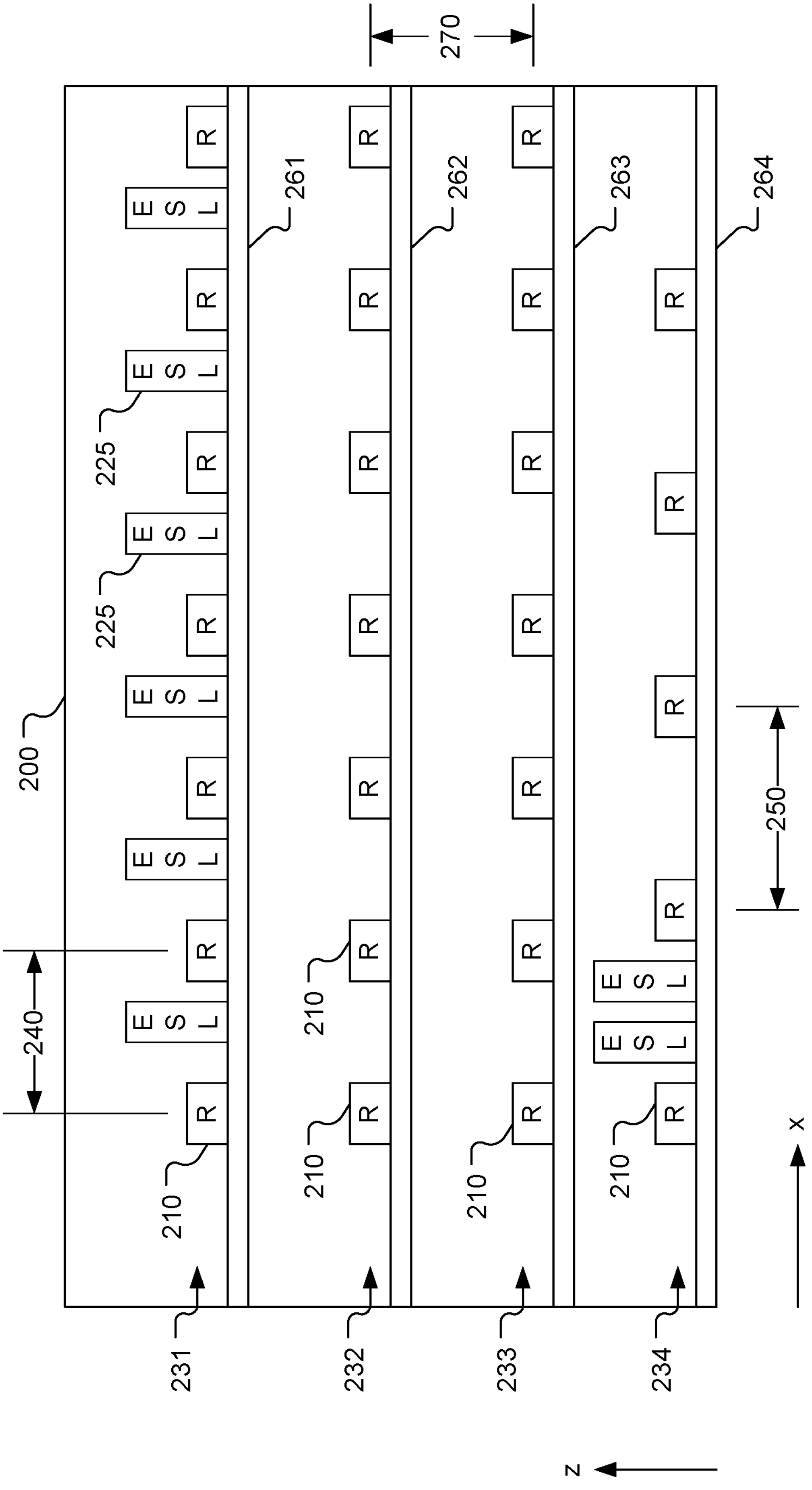
FIG. 2 is a plan view of gondola, shown in FIG. 1, with shelves containing anchor wireless-signal transmitters.

Referring also to FIG. 2, shelving unit 200, which may be called a gondola and which may be an example of one of the shelving units 140, may have a deployment of numerous ESL radios 210 and corresponding ESLs 225. Groups of the ESL radios 210 may be disposed in regularly-spaced arrays. For example, ESL radios 210 in each of ESL radio groups 231, 232, 233, 234 may be disposed at regular intervals, with center-to-center separation distances being consistent, with separation distances in different groups perhaps being different. For example, centers of the ESL radios 210 in each of the groups 231-233 are separated from the adjacent ESL radio(s) 210 by a separation distance 240 (e.g., between 1 m and 3 m), and centers of the ESL radios 210 in the group 234 are separated from adjacent ESL radio(s) 210 by a separation distance 250 that is larger than the separation distance 240. Further, the ESL radios 210 in different groups may be disposed at respectively different heights (here corresponding to different shelves 261, 262, 263, 264). A vertical separation distance 270 corresponding to the vertical separation of the groups 231-234 may be the same between vertically-adjacent groups of ESL radios 210. The regular spacing of ESL radios within groups may be leveraged to reduce overhead to provide locations of the ESL radios to a target UE to be positioned (i.e., a UE whose location is to be determined), e.g., a UE 160 shown in FIG. 1. Also, a different quantity of shelves may be provided in a store gondola, e.g., six shelves, etc.

The ESLs 225 may be installed along the shelves 261-264 within an aisle, although for sake of simplicity of FIG. 2. ESLs are only shown on the shelves 261, 264 in FIG. 2. One or more of the ESLs 225 may be equipped with a display and a camera. The ESL radios 210 may be deployed in a dense manner, e.g., such that radios are spaced in close proximity to each other, e.g., less than or equal to 4 m apart such as 2 m apart, 1 m apart, or a different distance apart.

Figure 3:
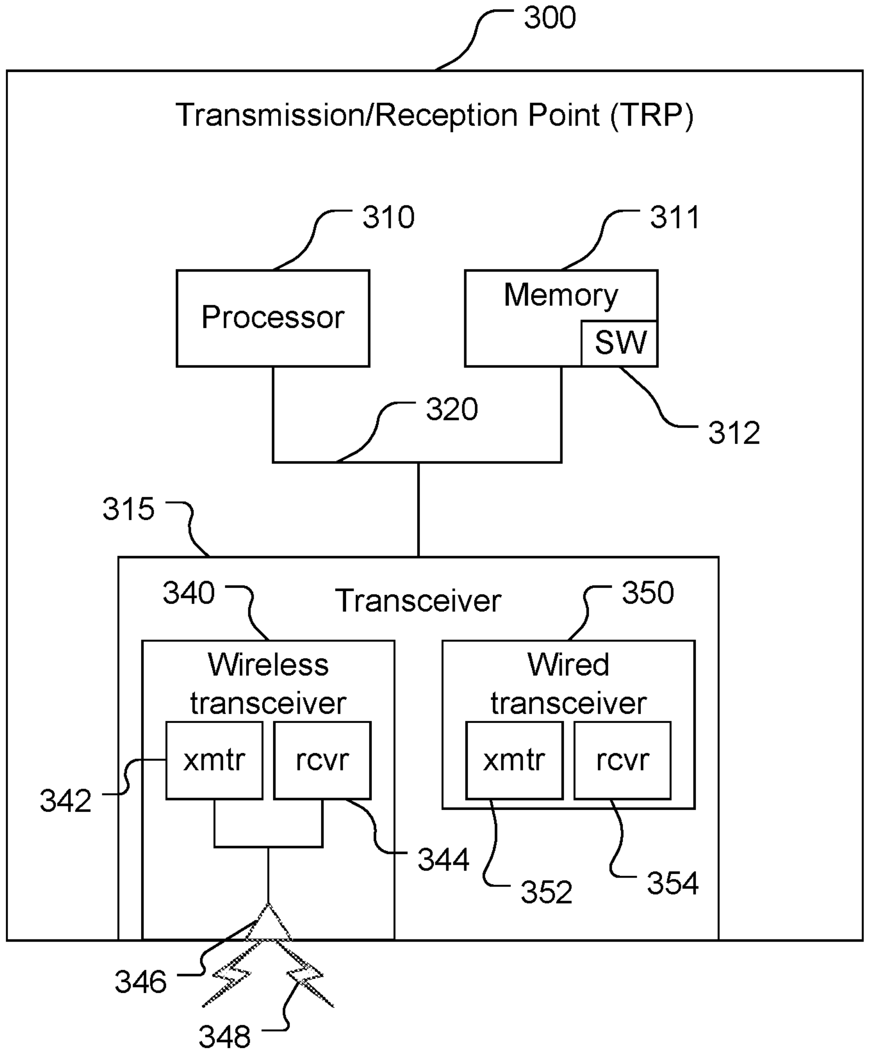
FIG. 3 is a block diagram of components of an example transmission/reception point.

Referring also to FIG. 3, an example of a TRP 300 (Transmission/Reception Point), which may be an example of the access points 120, comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP (Digital Signal Processor), a modem processor, a video processor, and/or a sensor processor). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (e.g., a gNB (general NodeB), an eNB (evolved NodeB), or an ng-eNB (next-generation eNB)) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to guided (e.g., electromagnetic, electrical, and/or optical) signals and from guided (e.g., electromagnetic, electrical, and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 160, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (Institute of Electrical and Electronics Engineers specification 802.11, including IEEE 802.11p), WiFi® wireless signaling protocol, WiFi® Direct (WiFi®-D) wireless signaling protocol, Bluetooth® short-range wireless signaling protocol, Zigbee® short-range wireless signaling protocol, etc. The wired transceiver 350 may include a wired transmitter 352 and a wired receiver 354 configured for wired communication, e.g., a network interface that may be utilized to communicate with an NG-RAN (Next Generation Radio Access Network) to send communications to, and receive communications from, the management entity 130 (e.g., an LMF (Location Management Function)), for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by another device (e.g., a server and/or a UE may be configured to perform one or more of these functions).

Figure 4:
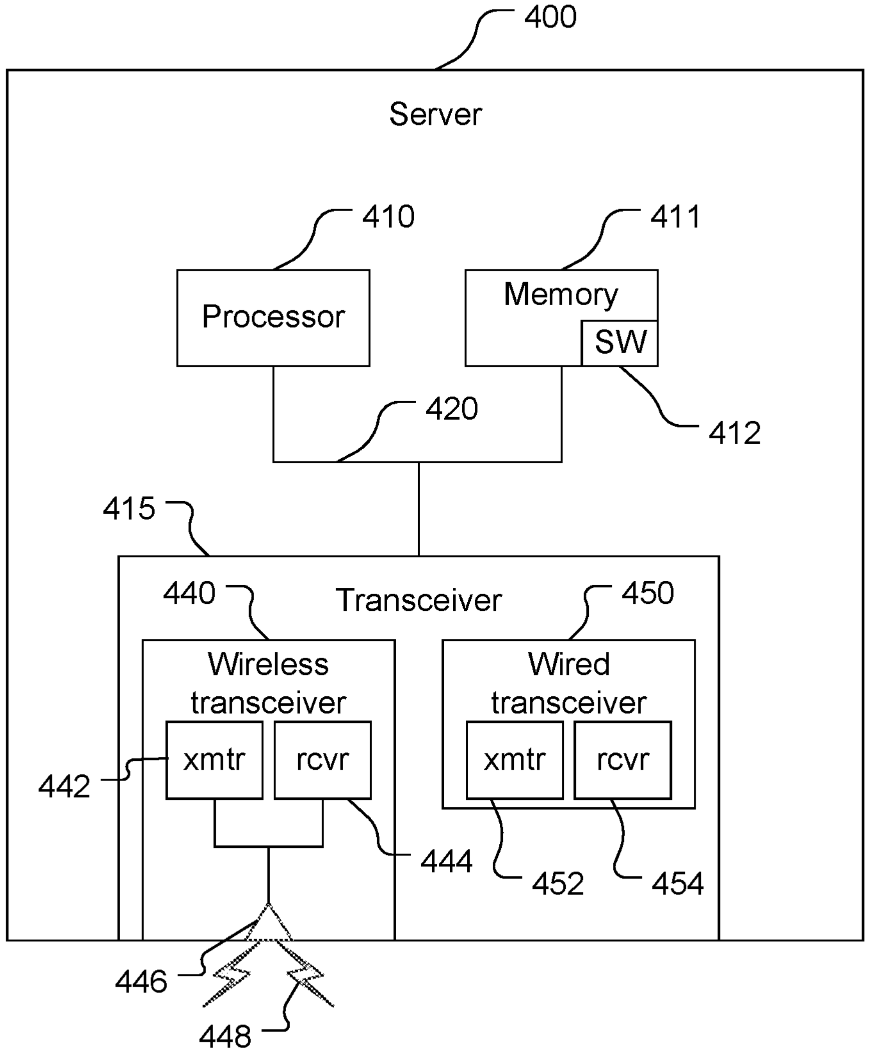
FIG. 4 is a block diagram of components of a server, various examples of which are shown in FIG. 1.

Referring also to FIG. 4, a server 400, that may be an example of the management entity 130, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to guided (e.g., electromagnetic, electrical, and/or optical) signals and from guided (e.g., electromagnetic, electrical, and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 160, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (Institute of Electrical and Electronics Engineers specification 802.11, including IEEE 802.11p), WiFi® wireless signaling protocol, WiFi® Direct (WiFi®-D) wireless signaling protocol, Bluetooth® short-range wireless signaling protocol, Zigbee® short-range wireless signaling protocol, etc. The wired transceiver 450 may include a wired transmitter 452 and a wired receiver 454 configured for wired communication, e.g., a network interface that may be utilized to communicate with an NG-RAN to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or another device, e.g., a UE (i.e., the TRP 300 and/or a UE may be configured to perform one or more of these functions).

Figure 5:
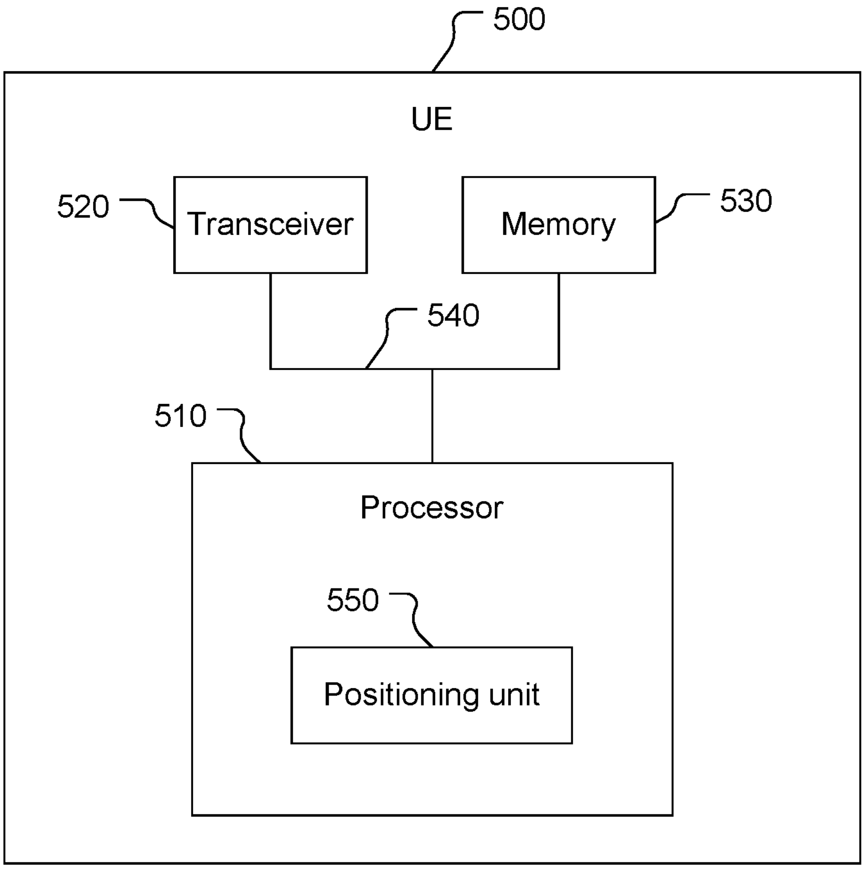
FIG. 5 is a simplified block diagram of an example user equipment.

Referring also to FIG. 5, a UE 500, which may be an example of the UE 160, includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The UE 500 may include the components shown in FIG. 5 and may include one or more other components. For example, the processor 510 may include one or more hardware devices, e.g., a central processing unit (CPU), a microcontroller, an application specific integrated circuit (ASIC), etc. The processor 510 may comprise multiple processors (e.g., including a general-purpose/application processor, a DSP, a modem processor, a video processor, and/or a sensor processor). The transceiver 520 may include one or more wireless transmitters, one or more wireless receivers, one or more antennas, one or more wired transmitters, and/or one or more wired receivers. The memory 530 may include software with processor-readable instructions configured to cause the processor 510 to perform functions as discussed herein.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a positioning unit 550. The positioning unit 550 may be configured to perform positioning operations (e.g., determine position information (e.g., measurements, pseudoranges, position estimates, etc.). The positioning unit 550 is discussed further below, and the description may refer to the processor 510 generally, or the UE 500 generally, as performing any of the functions of the positioning unit 550, with the UE 500 being configured to perform the function(s).

Figure 6:
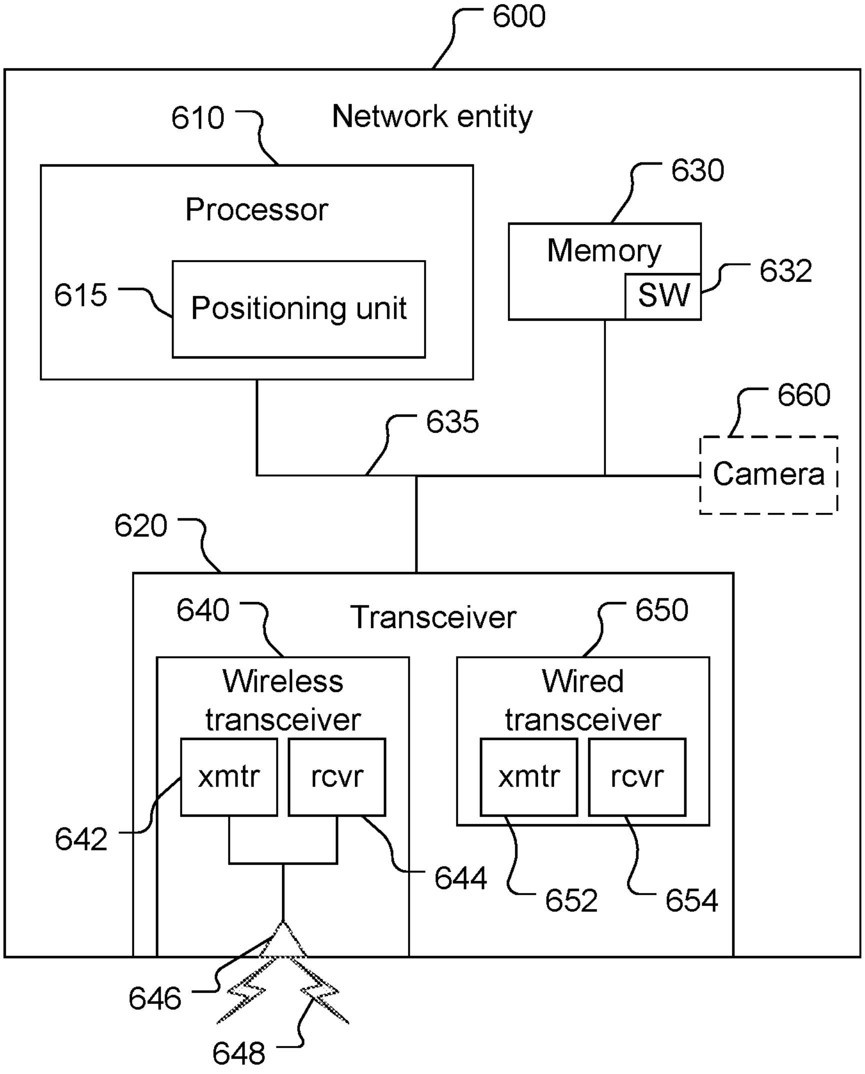
FIG. 6 is a simplified block diagram of an example network entity.

Referring also to FIG. 6, a network entity 600, which may be an example of an ESL radio, includes a processor 610, a transceiver 620, and a memory 630 communicatively coupled to each other by a bus 635. Even if referred to in the singular, the network entity 600 may include one or more network entities, the processor 610 may include one or more processors, the transceiver 620 may include one or more transceivers (e.g., one or more transmitters and/or one or more receivers), and the memory 630 may include one or more memories. The network entity 600 may include the components shown in FIG. 6, and may include one or more other components, and may be configured to be a component of a communication network (e.g., a terrestrial communication network such as a cellular network). The processor 610 may include one or more hardware devices, e.g., a central processing unit (CPU), a microcontroller, an application specific integrated circuit (ASIC), etc. The processor 610 may comprise multiple processors (e.g., including a general-purpose/application processor, a DSP, a modem processor, a video processor, and/or a sensor processor). The memory 630 may be a non-transitory storage medium that may include random access memory (RAM)), flash memory, disc memory, and/or read-only memory (ROM), etc. The memory 630 may store software 632 which may be processor-readable, processor-executable software code containing instructions that are configured to, when executed, cause the processor 610 to perform various functions described herein. Alternatively, the software 632 may not be directly executable by the processor 610 but may be configured to cause the processor 610, e.g., when compiled and executed, to perform the functions. The description herein may refer to the processor 610 performing a function, but this includes other implementations such as where the processor 610 executes software and/or firmware. The description herein may refer to the processor 610 performing a function as shorthand for one or more of the processors contained in the processor 610 performing the function. The description herein may refer to the network entity 600 performing a function as shorthand for one or more appropriate components of the network entity 600 performing the function. The processor 610 may include a memory with stored instructions in addition to and/or instead of the memory 630. Functionality of the processor 610 is discussed more fully below.

The transceiver 620 may include a wireless transceiver 640 and/or a wired transceiver 650 configured to communicate with other devices through wireless connections and wired connections, respectively. For example, the wireless transceiver 640 may include a wireless transmitter 642 and a wireless receiver 644 coupled to one or more antennas 646 for transmitting (e.g., on one or more downlink channels) and/or receiving (e.g., on one or more uplink channels) wireless signals 648 and transducing signals from the wireless signals 648 to guided (e.g., electromagnetic, electrical, and/or optical) signals and from guided (e.g., electromagnetic, electrical, and/or optical) signals to the wireless signals 648. Thus, the wireless transmitter 642 may include multiple transmitters that may be discrete components or combined/integrated components, and/or the wireless receiver 644 may include multiple receivers that may be discrete components or combined/integrated components. The wireless transceiver 640 may be configured to communicate signals (e.g., with the UE 160, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (Institute of Electrical and Electronics Engineers specification 802.11, including IEEE 802.11p), WiFi® wireless signaling protocol, WiFi® Direct (WiFi®-D) wireless signaling protocol, Bluetooth® short-range wireless signaling protocol, Zigbee® short-range wireless signaling protocol, etc. The wired transceiver 650 may include a wired transmitter 652 and a wired receiver 654 configured for wired communication, e.g., a network interface that may be utilized to communicate with an NG-RAN to send communications to, and receive communications from, the TRP 300, for example, and/or one or more other network entities. The wired transmitter 652 may include multiple transmitters that may be discrete components or combined/integrated components, and/or the wired receiver 654 may include multiple receivers that may be discrete components or combined/integrated components. The wired transceiver 650 may be configured, e.g., for optical communication and/or electrical communication.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a positioning unit 615. The positioning unit 615 may be configured to perform positioning operations (e.g., sending positioning signals, and possibly sending an indication of a location of the network entity 600, indications of locations of other network entities, a correction to a location of the network entity. and/or corrections to locations of other network entities. The positioning unit 615 is discussed further below, and the description may refer to the processor 610 generally, or the network entity 600 generally, as performing any of the functions of the positioning unit 615, with the network entity 600 being configured to perform the function(s).

Figure 7:
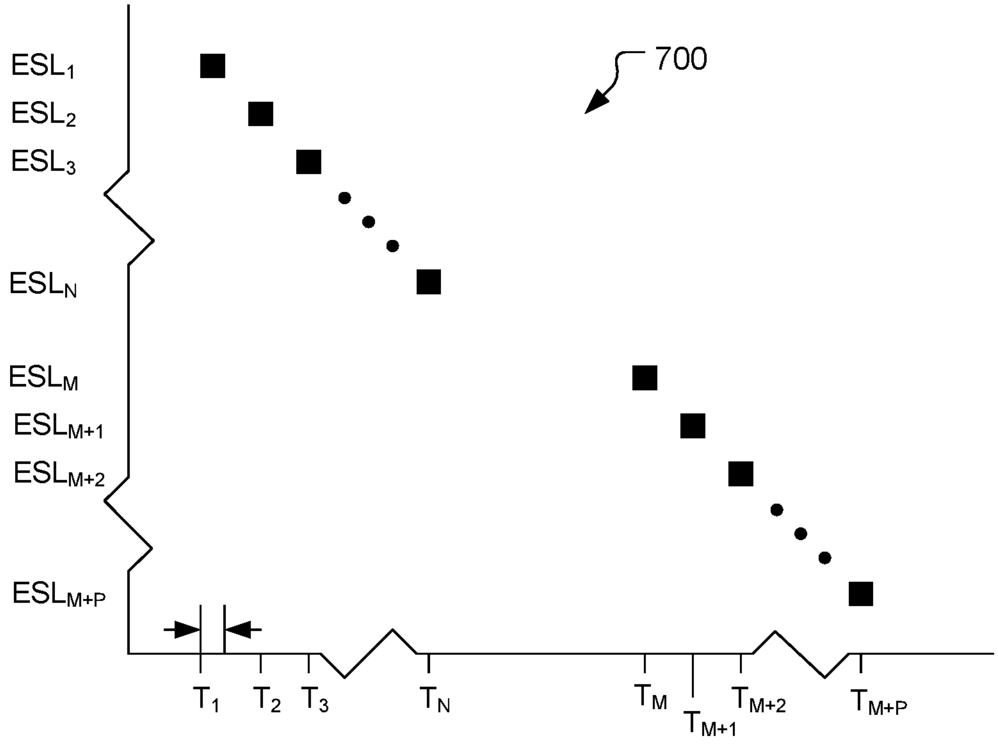
FIG. 7 is a graph of beacon signals transmitted from different radios in respective time windows.

Referring also to FIG. 7, the ESL radios 110, 210 are configured to transmit beacon signals in a TDMA (Time Division Multiple Access) manner. For example, the processor 610, e.g., the positioning unit 615, may be configured to transmit, via the wireless transmitter 642 and the antenna 646, a beacon signal during a time window assigned to the network entity 600, here, an ESL radio. The beacon signals may include an AP ID (AP identity), application-layer information (e.g., such that only customers of a store deploying the ESL radios 110, 210 may decode the beacon signals), an indication of a location (which may be called a location) of one or more of the ESL radios 110, 210, and/or other information. The positioning unit 615 may be configured dynamically (e.g., by a configuration message received via the transceiver 620 from the TRP 300 (e.g., the AP 120)) as to a time window in which to transmit a beacon signal. Different ESL radios may be assigned different time windows for transmitting their respective beacon signals. Also or alternatively, different network entities 600 may be assigned different frequencies for transmitting their respective beacon signals, e.g., different OFDM (Orthogonal Frequency Division Multiplexing) resource elements. As shown in FIG. 7, a TDMA schedule 700 of beacon signals includes time windows $T_1$, $T_2$, $T_3$, . . . , $T_N$ and time windows $T_M$, $T_{M+1}$, $T_{M+2}$, . . . , $T_{M+P}$. In this example, the time windows $T_1$, $T_2$, $T_3$, . . . , $T_N$ are assigned to ESL radios $ESL_1$, $ESL_2$, $ESL_3$, . . . , $ESL_N$ and the time windows $T_M$, $T_{M+1}$, $T_{M+2}$, . . . , $T_{M+P}$ are assigned to ESL radios $ESL_M$, $ESL_{M+1}$, $ESL_{M+2}$, . . . , $ESL_{M+P}$. such that each of the ESL radios $ESL_1$, $ESL_2$, $ESL_3$, . . . , $ESL_N$, $ESL_M$, $ESL_{M+1}$, $ESL_{M+2}$, . . . , $ESL_{M+P}$ is assigned a different (distinct) time window in which to transmit a respective beacon signal. In this way, beacon signals may be transmitted without colliding and a UE receiving the beacon signals can distinguish from which ESL radios the respective beacon signals are received.

The UE 500, e.g., the positioning unit 550, may be configured to determine a location of the UE 500 based on beacon signals received from the network entities 600 (e.g., the ESL radios 110, 210) and knowledge of the locations of the network entities 600 transmitting the respective beacon signals. For example, the UE 160 may be a target device and may receive beacon signals from multiple anchor nodes (here, ESL radios) and measure signal strengths to determine indications of signal strengths (e.g., RSSIs (Received Signal Strength Indicators) of the received beacon signals. The positioning unit 550 may be configured to determine the location of the UE 500 (e.g., the UE 160) as a weighted average of locations of the anchor nodes from which beacons signals are received. The locations of the anchor nodes may be weighted based on the RSSI values of the respective beacon signals. For example, the positioning unit 550 may be configured to determine the position of the UE 500 according to $$\hat{P} = \frac{\sum_{k=1}^{N} w_k \cdot P_k}{\sum_{k=1}^{N} w_k} \tag{1}$$

where $\hat{P}$ is the weighted average location, $w_k$ is a weight factor for a $k^{th}$ beacon signal (where the weight factor depends on the RSSI of the $k^{th}$ beacon signal), $P_k$ is the location of the ESL radio from which the $k^{th}$ beacon signal is received, and N is the quantity of received beacon signals used to determine the weighted average location. The quantity N may be the quantity of beacon signals received, or a total quantity of ESL radios in an environment, or may be another quantity, e.g., a specified number of highest-RSSI beacon signals that the UE 500 will consider to determine the weighted average location.

The transmission of the beacon signals by the network entities 600 may occupy a significant amount of overhead. For example, if the environment 100 includes numerous, e.g., tens of, hundreds of, or even thousands of, network entities 600 each transmitting a beacon signal, then the beacon signals constitute a large amount of signaling overhead, which uses a large amount of processing and transmission resources including power. To help reduce the potential overhead of the beacon signals, techniques are discussed herein for leveraging the regularity of locations of the network entities 600 to provide indications of the locations of the network entities 600 using less information than full locations for each network entity 600, e.g., by considering a layout of network entities, duty cycle of transmissions, one or more identifiers associated with one or more network entities, and/or subsets of network entities to be used for positioning. For example, coded locations instead of full locations may be included in beacon signals. As another example, location offsets may be used to indicate locations using fewer bits than full location indications for each network entity 600 based on consistent spacings between network entities. As another example, a subset of network entities 600 within an environment may be used to transmit beacon signals. The subset of network entities 600 may, for example, be a specified number of the network entities 600 within a threshold distance of a coarse location of a target UE, or a specified number of the network entities 600 corresponding to highest-RSSI beacon signals received by the target UE, or the network entities 600 from which beacon signals of at least a threshold RSSI are received by the target UE, or another collection of network entities 600 (e.g., determined in another manner). Still other examples of considerations and/or techniques for reducing signaling overhead may be used.

A location of the network entity 600 in an environment (e.g., any of the ESL radios 110 in the environment 100) may be indicated by an ID included in the beacon signal from the network entity 600. The environment 100 (e.g., a store) may be associated with a unique identifier along with a unique topology and/or deployment of the network entities 600. A region within the environment 100 may be associated with a unique relative offset relative to (with respect to) a reference point in the environment 100. For example, each of the aisles 150 of the environment 100 may be associated with a respective relative offset with respect to a reference point in the environment 100. Within each of the aisles 150, each shelf (e.g., each of the shelves 261-264) may be associated with a unique relative offset with respect to a reference point in the aisle, e.g., an entry point of the aisle 150. Each shelf of a gondola may be associated with a single network entity 600 such that a shelf ID is akin to a network entity ID. Alternatively, a single shelf may have multiple network entities 600 that each have a respective network entity ID and each of the network entity IDs may have one or more shared portions corresponding to the shared shelf (e.g., corresponding to a shared height component (z component of location) and a shared lateral location component (e.g., shared y component (see FIG. 1) of the location of the network entities 600)). A target device, e.g., the UE 500, may gauge at least a portion of a location of the network entity 600 by analyzing the network entity ID. The network entity 600 may thus not transmit a full location (e.g., all three coordinates of a three-dimensional location, e.g., x-coordinate, y-coordinate, and z-coordinate) of the network entity 600 because the network entity ID may provide a coded indication of at least one component of the location of the network entity 600. The coded location may use fewer bits than a full indication of the location component(s) coded into the network entity ID. The location(s) of the reference point(s) of the environment 100 (e.g., of the whole environment 100 and/or of a portion (e.g., an aisle) of the environment 100) may be provided to a target device. The reference point location(s) may be provided before the target device begins positioning, e.g., through a communication session with the management entity 130 upon the target device entering the environment 100.

A subset of the network entities 600 may be determined and used based on a coarse location of the target device. A coarse location of the target device may be determined based on one or more of a variety of factors. For example, the location of an access point that receives a signal from the target device, or the access point that receives a signal with a strongest RSSI if multiple access points receive the signal from the target device, may be used as a coarse location of the target device. Alternatively, a coarse location of the target device may be obtained using trilateration based on signals (e.g., 5G NR signals, short-range wireless protocol signals) transferred between the target device and one or more other devices, based on dead reckoning, and/or trilateration based on Satellite Positioning System (SPS) signals received by the target device. A subset of the network entities 600 may be determined as the network entities 600 close to the target UE, e.g., based on a threshold distance of the coarse location and/or based on signal strengths and/or based on one or more other criteria. A hierarchical approach may be taken to determine the subset of network entities.

Figure 8:
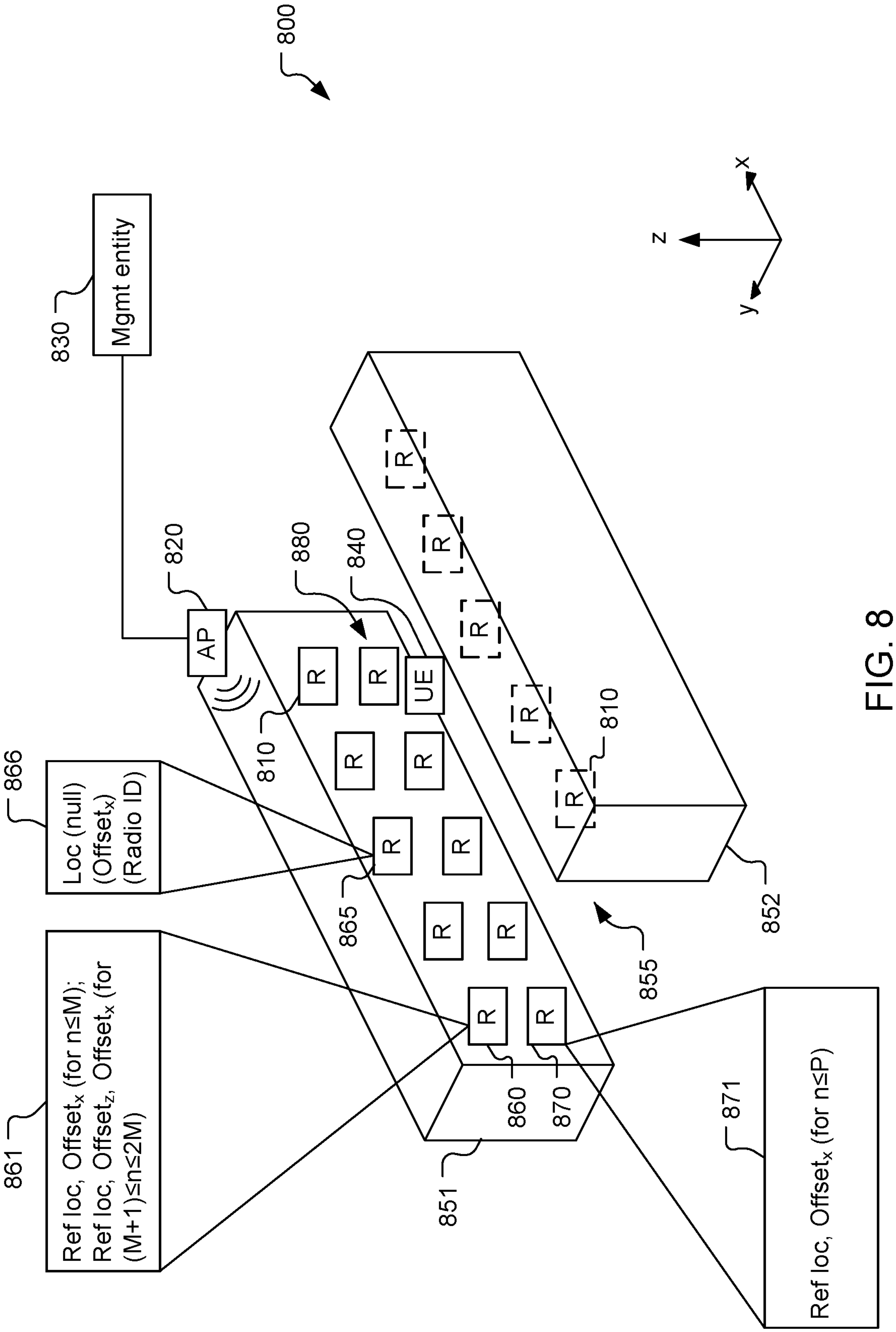
FIG. 8 is a perspective view of a portion of the deployment shown in FIG. 1, showing contents of beacon signals from some of the anchor wireless-signal transmitters.

Referring also to FIG. 8, the locations of network entities in an environment 800 may be indicated, using knowledge of topology of the ESL radio deployment, as distance offsets relative to a reference location, e.g., a complete (e.g., three-dimensional) location of a reference network entity. The environment 800 includes ESL radios 810 (e.g., each of which may be an example of the network entity 600), an AP 820, a management entity 830, and a target UE 840 (which may be an example of the UE 500). Some of the ESL radios 810 are disposed on a gondola 851 and some on a gondola 852, with the gondolas 851, 852 forming an aisle 855. The target UE 840 may not have any information, e.g., from the AP 820 or another source, as to the location of any of the ESL radios 810. Each of one or more reference ESL radios may transmit a location of the reference ESL radio and an indication of location offsets of other ESL radios, e.g., ESL radios in a line with the reference ESL radio (e.g., on the same shelf as the reference ESL radio). For example, a reference ESL radio 860 may transmit a beacon 861 that includes an indication (Ref loc) of the location of the reference ESL radio 860 and an indication of an offset for each of the other ESL radios in the same gondola on the same shelf (or at least at the same height) as the reference ESL radio 860. Here, the beacon signal 861 indicates an x-direction offset between each pair of ESL radios 810 at the same z-direction height as the reference ESL radio 860. For a beacon signal received in a later time window, the offset may be multiplied by the number of TDMA time windows since the time window containing the beacon signal 861 to determine the x-direction offset relative to the reference location to determine the location of the ESL radio 810 from which the beacon signal in the later time window is received. A location of another ESL radio 810 may be determined according to $$B_n = A + (t_n - t_A)\cdot \text{Offset}_x \quad (2)$$

where $B_n$ is the location of the ESL radio 810 from which a present beacon signal is received, A is the location of the reference ESL radio 860, $t_n$ is an index (number) of a present time window for beacon signal transmission/reception, $t_A$ is an index (number) of the time window of beacon signal transmission/reception from the reference ESL radio 860, and $\text{Offset}_x$ is a magnitude of x-direction separation corresponding to each time window (e.g., between adjacent ESL radios 810) in a group whose locations are indicated in the beacon signal 861. The beacon signal 861 may indicate a quantity of ESL radios for which the indicated offset applies, i.e., a quantity of other ESL radios 810 in a group with the reference ESL radio 860. In this example, the beacon signal 861 indicates that the value of $\text{Offset}_x$ is applicable for $n \le M$, where n is the index of the beacon signals, and M is the index of the last time window for which the value of $\text{Offset}_x$ is applicable. If the value of n for the beacon signal 861 equals “0”, and a beacon signal from each adjacent ESL radio 810 is transmitted in each consecutive time window, then the value of M corresponds to the number of ESL radios 810 in the group in addition to the reference ESL radio 860. The beacon signal 861 may not include an indication of an expiration of the indicated distance offset(s). For example, the offset may be assumed to be valid until a next beacon signal containing an explicit, complete (e.g., three-dimensional) ESL radio location is received. The inclusion of the explicit, complete reference ESL radio location may be an indication that the beacon signal (e.g., the beacon signal 861) is the beginning of a cycle of beacon signals where other beacon signals in the cycle will not include location information (or at least not complete, explicit location information for any of the respective transmitting ESL radios). The duration (e.g., number of time windows for beacon signal transmission) may be known by the target UE 840, e.g., from information provided by the AP 820.

By indicating the distance offsets of other ESL radios 810 in a group, each of the other ESL radios 810 may transmit a beacon signal that contains less, if any, information as to the location of the transmitting ESL radio 810. For example, an ESL radio 865 in a row with the reference ESL radio 860 may transmit a beacon signal 866 that includes no location information as to the location of the ESL radio 865 ("Loc (null)"). Alternatively, the ESL radio 865 may transmit the beacon signal 866 to include a distance offset relative to the reference location. In either case, the beacon signal 866 does not transmit as many bits as would be transmitted to explicitly indicate the complete three-dimensional location of the ESL radio 865. The beacon signal 866 may implicitly indicate the location of the ESL radio 865, e.g., by indicating the x-direction offset, which implies that the complete location of the ESL radio 865 is the reference location of the reference ESL radio 860 plus the x-direction offset. The beacon signal 866 may include a radio ID of the ESL radio 865, although the radio ID may be omitted from the beacon signal 866. The radio ID may indicate a location, e.g., a relative location, of the ESL radio 865. The radio ID may indicate a location relative to the reference location, e.g., one or more indications of relative horizontal (x and/or y) distance and/or an indication of relative vertical distance. The radio ID may, for example, provide one or more indications of a gondola of the transmitting ESL radio 810 and/or a shelf (e.g., of an indicated gondola) of the transmitting ESL radio.

A beacon signal from a reference ESL radio may indicate more than one distance offset for one or more other ESL radios 810. For example, the beacon signal 861 includes a vertical offset $Offset_z$ and another horizontal offset $Offset_x$ for time window indexes from M+1 to 2M corresponding to a group 880 of ESL radios 810 that is vertically offset from the reference ESL radio 860. A beacon signal such as the beacon signal 861 may include three-dimensional offset information, e.g., x-direction, y-direction, and z-direction offsets. Also or alternatively, another reference ESL radio 870 of the group 880 may transmit a beacon signal 871 with an explicit, complete location of the reference ESL radio 870 and an offset for other ESL radios 810 in the group 880.

The AP 820 may provide the target UE 840 with information that the target UE 840 may use to determine locations of the ESL radios 810 based on the beacon signals. For example, the AP 820 may inform the target UE 840 as to the time windows in which the ESL radios 810 will transmit respective beacon signals. The AP 820 may inform the target UE 840 of the time windows in which reference ESL radios 810 will transmit respective beacon signals that include explicit, complete locations of the respective reference ESL radio. The AP 820 may indicate the time windows in one or more of a variety of manners, e.g., absolute times, or a multiple of time windows relative to a reference absolute time window (e.g., 1 ms every 10 ms starting at time HH:MM:SS), etc. The AP 820 may inform the target UE 840 of the offset(s) in one or more groups of ESL radios 810, and may inform the target UE 840 as to the member ESL radios 810 of one or more ESL radio groups. The AP 820 may inform the target UE 840 of the location(s) of one or more reference ESL radios 810, e.g., may provide the explicit, complete location(s) of one or more reference ESL radios 810.

The target UE 840 may use the reference location and the offset information (e.g., from the AP 820 and/or from the reference ESL radio 860 in the beacon signal 861) and a time slot of a received beacon signal (e.g., the beacon signal 866) to determine a location of the ESL radio 810 from which the received beacon signal is received. For example, the positioning unit 550 may use Equation (2) to determine the location of the ESL radio 865. If the AP 820 provided the target UE 840 with time windows of beacon signals of a reference ESL radio and one or more other ESL radios, a reference ESL radio location, and the offset(s) to the other ESL radios, then the target UE 840 may wake up for the beacon signal from the reference ESL radio, and use the received reference location and offset(s) to determine the locations of the other ESL radios based on timing of received beacon signals from the other ESL radios.

Figure 9:
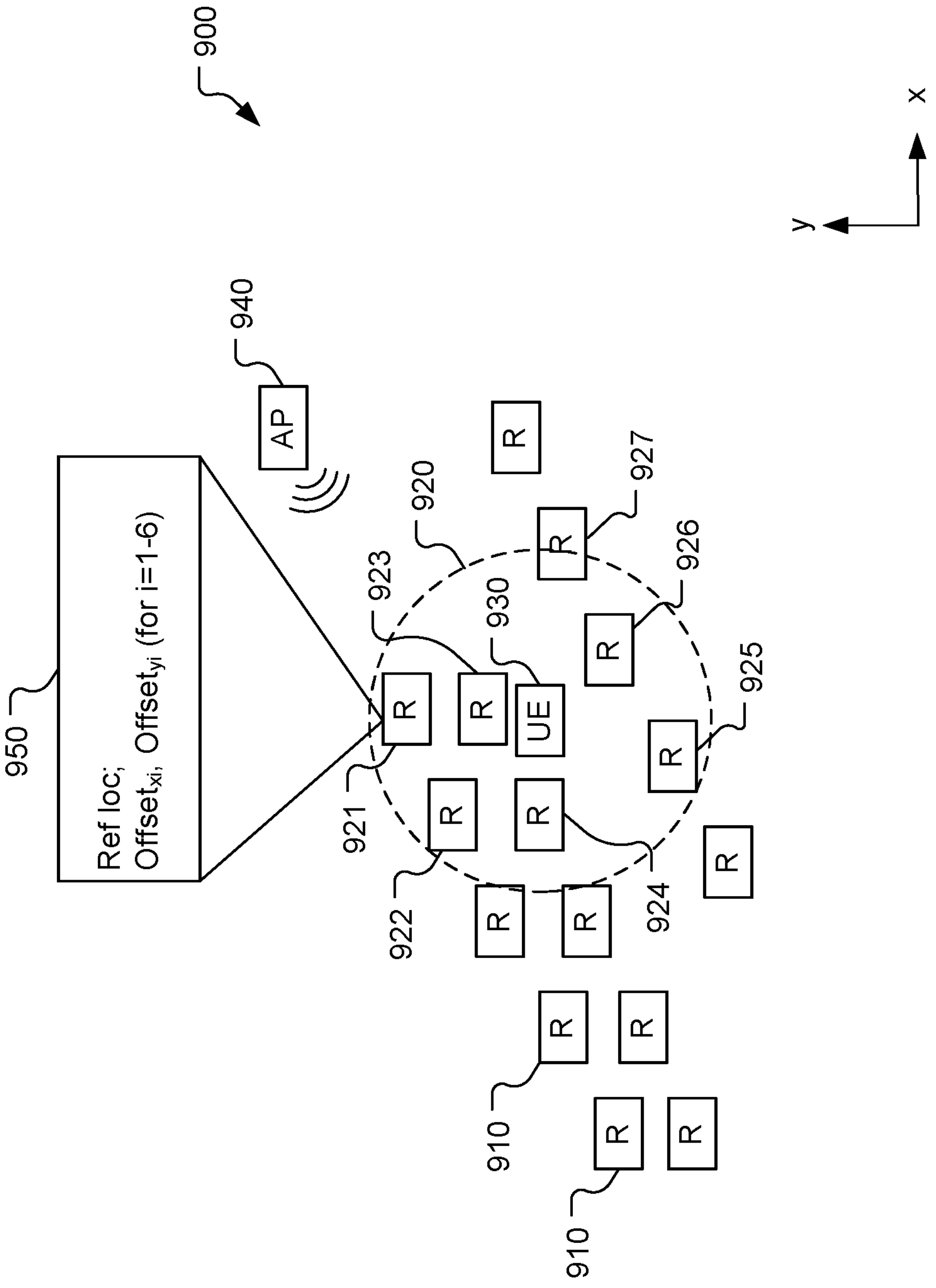
FIG. 9 is a top view of anchor wireless-signal transmitters and a target user equipment.

Referring also to FIG. 9, a subset of available ESL radios may be selected and used for positioning a target UE, which may reduce positioning overhead, e.g., by reducing beacon signals to the subset of ESL radios, or reducing positioning overhead in beacon signals to the subset of ESL radios. For example, a subset 920 of ESL radios 921, 922, 923, 924, 925, 926, 927 may be selected based on a coarse location of a target UE 930 in an environment 900. The coarse location of the target UE 930 may be determined using one or more of a variety of techniques such as SPS positioning, using a location of an AP 940 that receives a signal from the target UE 930 with a highest RSSI as the location of the target UE 930, etc. The AP 940 may be configured to determine the ESL radios to be in the subset of ESL radios, and may inform the ESL radios in the subset, here the ESL radios 921-927, may inform the target UE 930 about the subset 920 (including the ESL radios 921-927 in the subset 920), and may (configure and) inform the ESL radios 921-927 and the target UE 930 of a beacon schedule for the ESL radios 921-927. For example, the AP 940 may instruct the ESL radios 921-927 of the subset 920 to transmit respective beacons more frequently than the ESL radios 910 not in the subset 920 (or another subset). For example, the AP 940 may instruct the ESL radios 921-927 of the subset 920 to transmit respective beacons every 1.6 seconds and to instruct ESL radios 910 outside the subset 920 to transmit beacons every 16 seconds (with each ESL radio 910 transmitting a respective beacon in a different time window and/or using a different frequency). The subset 920 may, as in the example of FIG. 9, comprise any of the ESL radios 910 of the environment 900 within a threshold distance of the target UE 930. Designating a subset of ESL radios may reduce positioning overhead (e.g., by having fewer beacon signals transmitted) and/or may reduce positioning latency (e.g., by having the target UE 930 process fewer beacon signals to determine the location of the target UE 930).

In each subset of ESL radios, at least one or more of the ESL radios may transmit the explicit, complete location of the respective ESL radio. For example, the ESL radio 921 may transmit a beacon signal 950. The ESL radio 921, and any other ESL radio that transmits an explicit, complete location of the ESL radio, may be called a lead radio, a lead ESL radio, a reference radio, or a reference ESL radio. Each lead ESL radio may transmit one or more indications of offsets corresponding to the other ESL radios in the subset. For example, for a regularly-spaced subset of ESL radios, the offset indication(s) may be similar to the offset indication(s) shown in the beacon signal 861. A subset of ESL radios may have an irregular geometry. For example, the subset 920 has an irregular geometry in that the locations of the ESL radios 921-927 are not disposed in a single line. With an irregular geometry, a beacon signal may include one or more offset indications each applying to multiple ESL radios, and/or may include one or more offset indications each applying to a single ESL radio. For example, the beacon signal 950 includes an explicit, complete indication of a reference location corresponding to the ESL radio 921, and an offset pair (comprising an x-coordinate offset $\text{Offset}_{xi}$ and a y-coordinate offset $\text{Offset}_{yi}$) for an $i^{th}$ one each of the other six ESL radios 922-927 in the subset 920. The location of a radio in a subset may be given by $$B_n = A + \text{Offset}_n \qquad (3)$$

where $\text{Offset}_n$ is the distance offset(s) of the location of the $n^{th}$ ESL radio relative to the location, A, of a lead radio.

The beacon signal 950 and/or a signal from the AP 940 may indicate a number of beacon time windows for the subset 920 and/or the number of ESL radios in the subset 920. The ESL radios 921-927 may transmit beacons multiple times (e.g., in multiple cycles of the ESL radios 921-927). In a first cycle, a lead ESL radio may transmit the explicit, complete location and offset(s) of other ESL radios in the subset. On subsequent cycles, one or more of the beacons may not include location information. For example, even the beacon signals of the lead radio(s) may not include a location of the lead radio transmitting the beacon signal. The subset may be controlled such that periodically (e.g., every five cycles of the subset) at least one lead radio transmits the location of the lead radio and the offset(s) for the other radios in the subset.

There may be one or more, or no, subsets of ESL radios in an environment at any given time, and a subset that has radios that beacon less frequently than other subsets or radios outside of the subset may have a higher number of lead radios. Thus, if a subset cycles through the radios in the subset infrequently, then having multiple lead radios in the subset may help reduce latency for positioning of the target UE 930 by enabling the target UE 930 to determine the locations of at least some of the radios in the subset without having to wait for a new cycle of the entire subset. With the locations of some of the radios in the subset known, the target UE 930 may determine a location of the target UE 930, e.g., using Equation (1).

Figure 10:
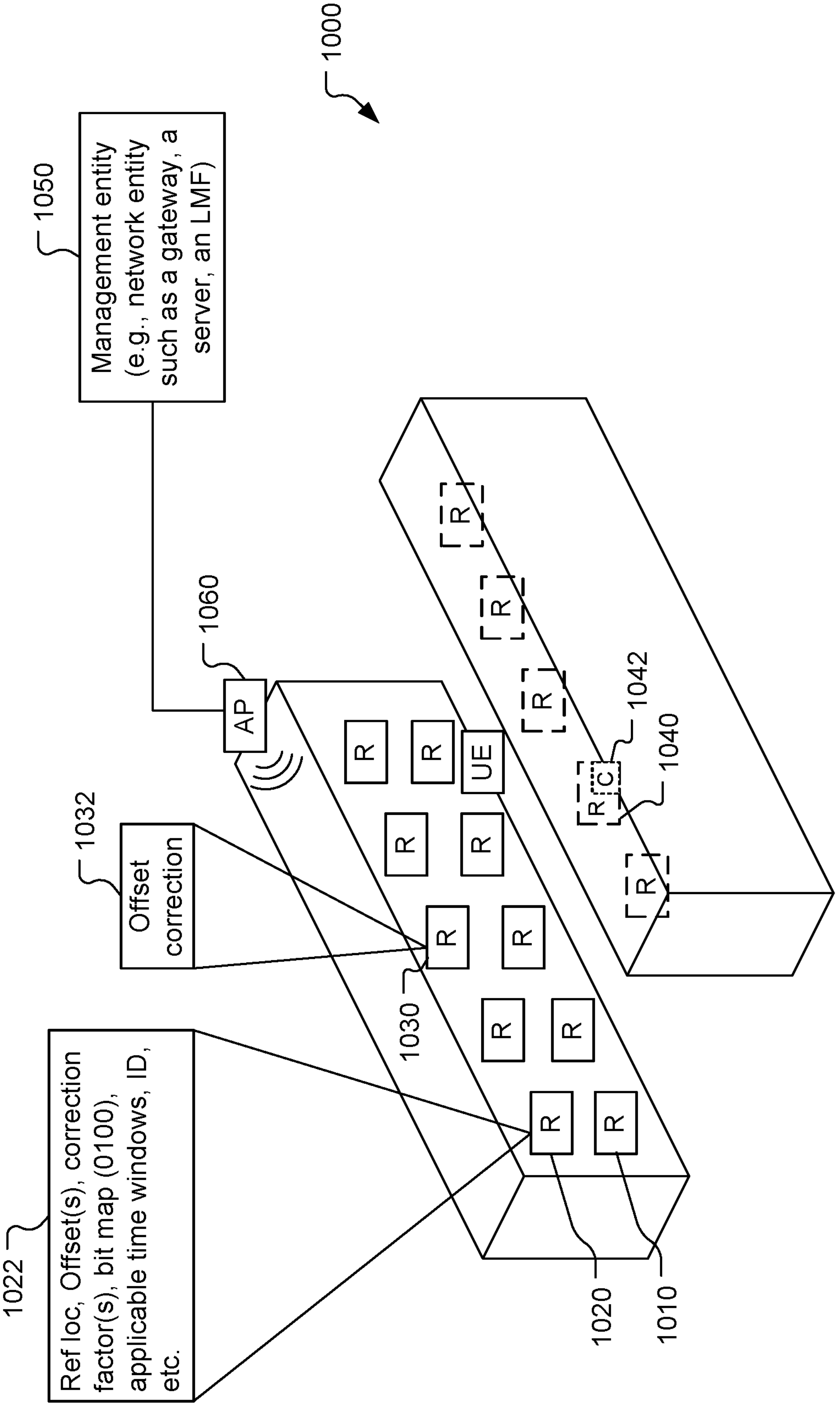
FIG. 10 is a perspective view of a portion of the deployment shown in FIG. 1, showing contents of beacon signals from some of the anchor wireless-signal transmitters.

Referring also to FIG. 10, a location of one or more ESL radios may not correspond to an original deployment and/or may not be regularly-spaced within a deployment. A radio may not be regularly-spaced for any of a variety of reasons, e.g., human error in deployment, movement (intentional or unintentional) of a radio, etc. The location of each ESL radio whose location is changed or that is non-regularly-spaced may be indicated to the target UE, e.g., by an AP, by a lead radio, by the moved/non-regularly-spaced radio, and/or by another radio. For example, an environment 1000 may include ESL radios 1010 including a lead ESL radio 1020 and a secondary ESL radio 1030, with the secondary ESL radio 1030 having been moved or non-regularly-spaced relative to adjacent ones of the ESL radios 1010. The lead radio 1010 may transmit a beacon signal 1022 that includes a reference location of the lead radio 1010, one or more offsets of other radios, time windows of beacon signal transmissions by the other radios, an ID of the lead radio 1010, etc. The secondary radio 1030 may transmit a beacon signal 1032 that includes a location correction, which may be called a correction factor or an offset correction (e.g., if the location of a radio is indicated by a combination of the reference location and an offset). The location correction may indicate one or more directional corrections (e.g., an x-coordinate correction, a y-coordinate correction, and/or a z-coordinate correction) that indicate an adjustment in the location of the secondary radio 1030 relative to a location indicated by the beacon signal 1022 (i.e., the reference location and the offset(s) for the secondary radio 1030). Also or alternatively, the beacon signal 1022 may include an indication for each which other radio(s) a respective location correction is applicable. For example, the beacon signal 1022 may include a bitmap with each bit corresponding to a respective ESL radio (e.g., a corresponding time window) and indicating whether a location correction is to be applied to a respective radio (e.g., a "1" indicating that a location correction is to be applied to a radio corresponding to the bit and a "0" indicating that no location correction is to be applied to a radio corresponding to the bit). Also or alternatively, the beacon signal 1022 may include the location correction for the secondary radio 1030 based on the lead radio 1020 obtaining information as to the appropriate correction amount(s). The beacon signal 1022 may include a correction factor to indicate a missing radio, e.g., in an otherwise regular distribution of radios corresponding to the offset(s) indicated in the beacon signal 1022. For example, the beacon signal 1022 may indicate that the offset(s) indicated apply for M time windows, but not for a $j^{th}$ time window of the M time windows.

A location correction may be determined reactively, with a change in a location of an ESL radio being measured and provided by an entity that moves the radio. For example, an ESL radio may be moved by a person or a robot. The person or robot may determine (e.g., measure) the change in location of the radio and provide a corresponding location correction to a lead radio and/or one or more access points corresponding to the moved radio (e.g., an access point closest to the radio before being moved and an access point closest to the radio after being moved).

A location correction may be determined proactively, with a change in a location of an ESL radio being measured by one or more other devices in a deployment including the moved radio, and reported to one or more appropriate entities, e.g., one or more lead radio(s) and/or one or more access points of the deployment. For example, a radio 1040 may include a camera 1042 (e.g., a single device may include a radio and a camera (e.g., the network entity 600 may include a camera 660 communicatively coupled to the processor 610 via the bus 635), or the camera may be associated with (e.g., communicatively coupled to) the radio). The camera 1042 may provide images to the processor 610 and the processor 610 may determine (e.g., by implementing computer vision) whether the radio 1040 and/or another one of the radios 1010, e.g., the radio 1030 that is in a field of view of the camera 1042, has moved and if so, by how much and in which direction(s). For example, the processor 610 may detect a non-uniformity in spacing between adjacent radios, e.g., a change from a uniform spacing to a non-uniform spacing. As another example, the processor 610 may determine that a beacon signal is heard from a particular radio and then later not heard in a time window (or a threshold number of consecutive time windows) in which the particular radio is scheduled to transmit a beacon signal, indicating that the particular radio may be failing and/or may have been moved out of range of the network entity 600. As another example, the processor 610 may determine that a beacon signal is heard that was not previously heard, indicating that the radio from which the beacon signal is heard may have been moved from out of range of the network entity 600 to in range of the network entity 600. As another example, the processor 610 may determine that a signal strength (e.g., an RSSI) of a beacon signal changes, indicating that a distance between the network entity 600 and the radio source of the beacon signal may have changed. The processor 610 may, for example, listen for beacon signals within a subset of the radios 1010 of the environment 1000. If a potential change in location of one or more radios is detected, then the network entity 600 (e.g., the radio 1040) may send a notice to this effect to a management entity 1050, e.g., via an AP 1060. One or more radios may be informed of a change in location of a radio and the one or more radios may transmit an indication of the location change, e.g., a correction factor. A radio transmitting an indication of a radio location change may be the radio whose location changed or may be another radio, e.g., a lead radio.

Figure 11:
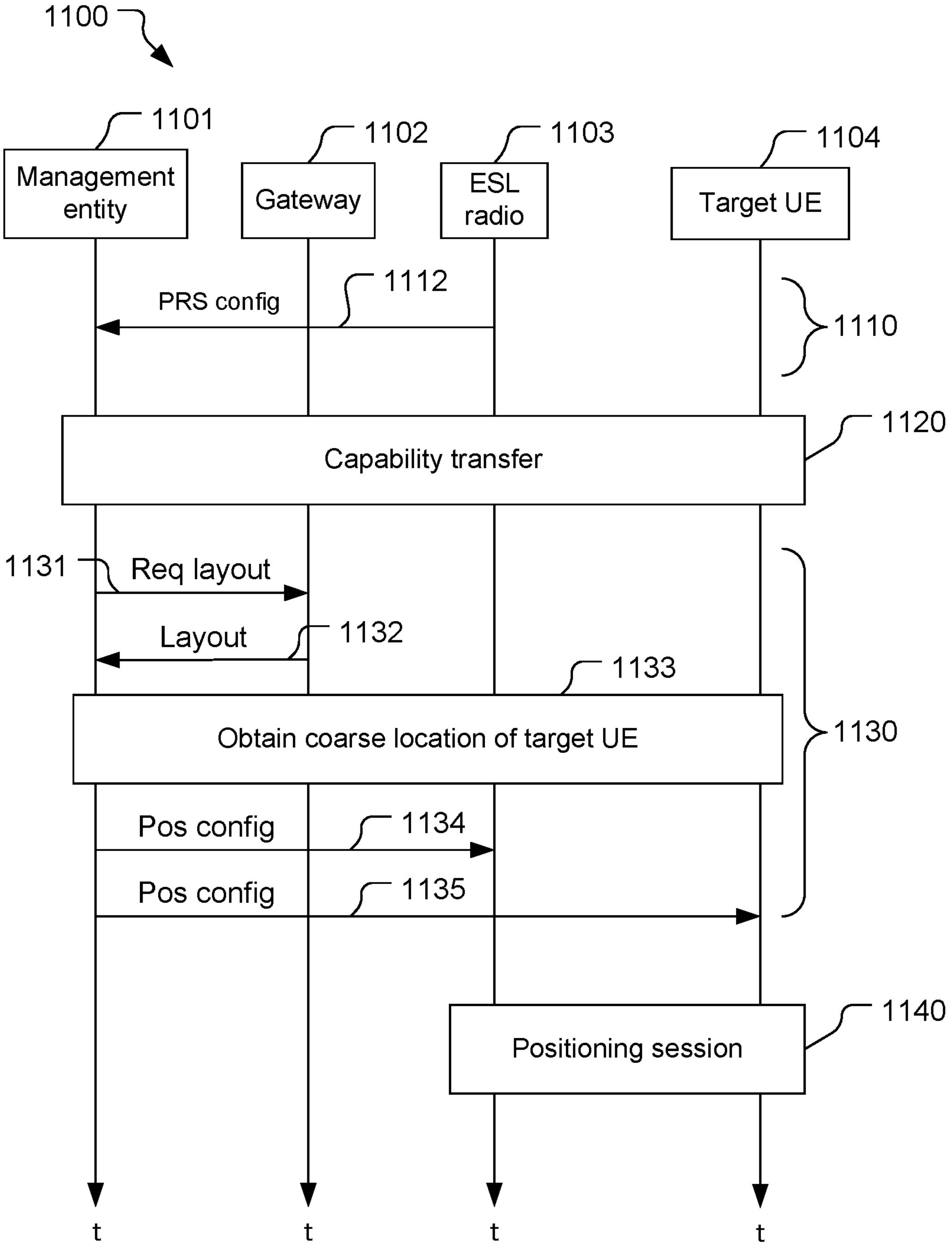
FIG. 11 is an example signaling and process flow for positioning a target user equipment.

FIG. 11 is a signaling and process flow 1100 for positioning of a target UE 1104 with ESL radios using a cellular signaling protocol (e.g., 5G NR). As shown, the flow 1100 includes signal transfer to and from a management entity 1101, a gateway 1102 (e.g., an edge server), an ESL radio 1103, and the target UE 1104. The management entity 1101, the gateway 1102, and the ESL radio 1103 may each be an example of the network entity 600, and the target UE 1104 may be an example of the UE 500. The flow 1100 is an example, and one or more stages may be added to the flow 1100, one or more stages shown may be omitted from the flow 1100, stages of the flow 1100 may be rearranged, and/or two or more stages may be combined.

At stage 1110, the ESL radio 1103 transmits positioning signal configuration information to the management entity 1101 (e.g., an LMF). For example, the ESL radio 1103 may transmit a PRS (Positioning Reference Signal) configuration message 1112 to the management entity 1101 with parameters for PRS transmissions by the ESL radio 1103. The management entity 1101 may use the configuration information to allocate and/or schedule signaling by the ESL radio 1103 (and other ESL radios).

At stage 1120, capability information and assistance data may be transmitted between the management entity 1101 and the target UE 1104. For example, the target UE 1104 may transmit (e.g., using LPP (LTE Positioning Protocol (LPP)) one or more capabilities of the target UE 1104, e.g., to the management entity 1101. The UE capabilities sent may include indications of which positioning methods are supported by the UE and possibly one or more additional details for each method, such as positioning mode (UE-based and/or UE-assisted), and specific assistance data that are supported by the UE. The management entity 1101 may use the indicated UE capabilities to decide on the positioning method(s) to be employed in order to fulfill a location service request (e.g., one or more requirements on accuracy and/or response time). The management entity 1101 may provide assistance data to the UE for performing the positioning method(s). The assistance data may depend on the selected positioning method(s) and may include, for example, GNSS (Global Navigation Satellite System) assistance data for A-GNSS (Assisted-GNSS), a list of TRPs for DL-TDOA (Downlink-Time Difference Of Arrival) positioning together with positioning reference signal configurations, etc.

At stage 1130, configuration information for use in a positioning session is determined and provided to the ESL radio 1103 and the target UE 1104. The management entity 1101 may transmit a layout request message 1131 to the gateway 1102 requesting the layout of a deployment of ESL radios. The gateway 1102 may transmit a layout message 1132 to the management entity 1101 indicating the locations of the ESL radios in the deployment. At sub-stage 1133, a coarse location of the target UE 1104 is obtained by the management entity 1101. For example, an access point that is within range of the target UE 1104 may be identified (e.g., by the access point and/or by the target UE 1104) and the management entity 1101 may use a location of the identified access point as a coarse location of the target UE 1104. The management entity 1101 (e.g., the server 400) may use the layout information, the coarse location of the target UE 1104 (if obtained), the PRS configuration information, capability information obtained at stage 1120, and/or other appropriate information, to determine configuration information for a positioning session between the ESL radio 1103 and the target UE 1104. The management entity 1101 may transmit a positioning configuration message 1134 to the ESL radio 1103 (and other ESL radios). The message 1134 may indicate: a PRS periodicity; a subset of ESL radios in the deployment; whether the ESL radio 1103 should transmit the explicit, complete location of the ESL radio 1103 in the beacon signal of the ESL radio 1103; one or more location offsets of one or more other ESL radios; and/or one or more correction factors for one or more respective ESL radios. The management entity 1101 may transmit a positioning configuration message 1135 to the target UE 1104. The message 1135 may indicate: a set of time windows in which the target UE 1104 should listen for beacon signals; a subset of ESL radios to listen for (e.g., a subset of time windows in which to listen for beacon signals); and/or one or more location offsets, if known, of one or more corresponding ESL radios. The positioning configuration information may also or alternatively indicate unique RTD (Reference Time Difference) values (with each unique RTD value indicated only once), and which TRP(s) correspond to each of the indicated RTD values. This may reduce data storage and data transfer overhead compared to storing and indicating RTD values for each TRP, including duplicate RTD values.

At stage 1140, a positioning session is conducted with the ESL radio 1103 and the target UE 1104. For example, the target UE 1104 may receive a beacon signal from the ESL radio 1103 and beacon signals from other ESL radios. The target UE 1104, e.g., the positioning unit 550, may determine a position of the target UE 1104, e.g., using Equation (1), based on RSSI values of at least a subset of the received beacon signals and knowledge of the locations of the ESL radios corresponding to these RSSI values.

Figure 12:
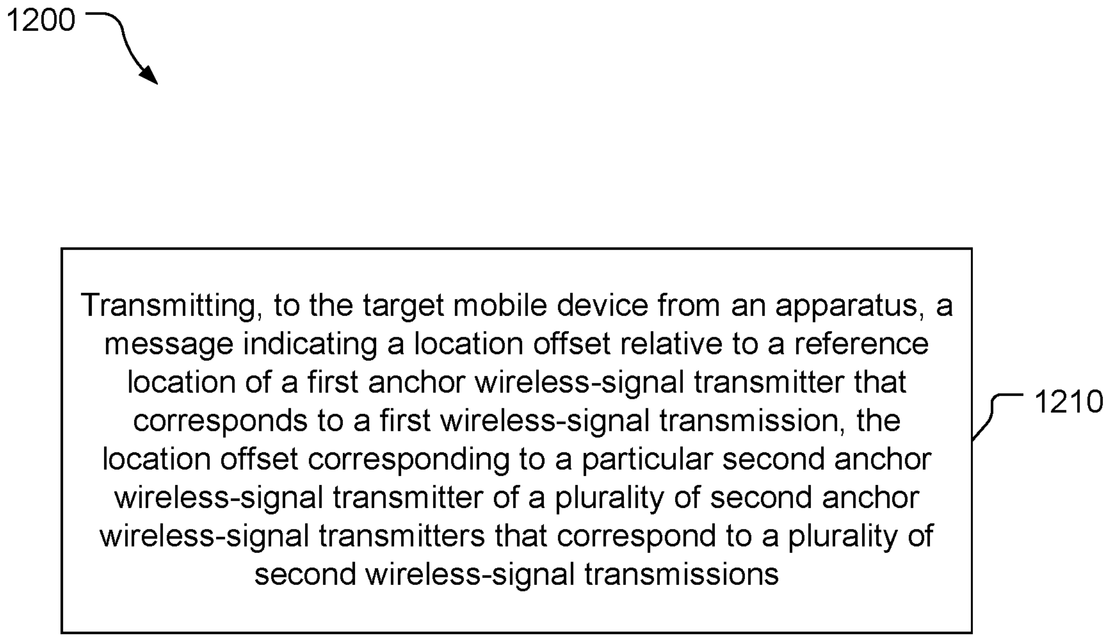
FIG. 12 is a block flow diagram of a method for use in positioning a target mobile device.

Referring to FIG. 12, with further reference to FIGS. 1-11, a method 1200 for use in positioning a target mobile device includes the stages shown. The method 1200 is, however, an example and not limiting. The method 1200 may be altered, e.g., by having one or more stages added, and/or having a single stage split into multiple stages.

At stage 1210, the method 1200 includes transmitting, to the target mobile device from an apparatus, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions. For example, a lead radio, e.g., the radio 860, may transmit a beacon signal, e.g., the beacon signal 861, that includes a location offset indicative of a location of another radio (e.g., the radio 865) relative to a location of the lead radio. The processor 510, possibly in combination with the memory 530, in combination with the transceiver 520, may comprise means for transmitting the location offset. As another example, the network entity 600 (e.g., a server or an access point) may transmit a message, e.g., the positioning configuration message 1135, including a location offset of a follower radio relative to a lead radio (e.g., with content including content similar to content of the beacon signal 861). The processor 610, possibly in combination with the memory 630, in combination with the transceiver 620, may comprise means for transmitting the location offset. As another example, a follower radio, e.g., the radio 865, may transmit a location offset (e.g., in the beacon signal 866) of a location of the follower radio relative to a lead radio.

Implementations of the method 1200 may include one or more of the following features. In an example implementation, the message indicates a plurality of location offsets relative to the reference location, and wherein each of the plurality of location offsets corresponds to a respective second anchor wireless-signal transmitter of the plurality of second anchor wireless-signal transmitters. For example, a beacon signal, e.g., the beacon signal 861, from a lead radio may indicate offsets of multiple follower radios. The offsets may be indicated as a single distance offset to be multiplied by a number of time windows (e.g., from a time window containing the beacon signal from the lead radio). As another example, the message, e.g., the positioning configuration message 1135, from the network entity 600 may include offsets for multiple follower radios. In a further example implementation, the message indicates the reference location. For example, the beacon signal 861 (or a message, e.g., the message 1135, from the network entity 600) may include the location of a lead radio (e.g., the reference ESL radio 860), e.g., an explicit, complete three-dimensional indication of location. In a further example implementation, the apparatus comprises the first anchor wireless-signal transmitter, and the message comprises a beacon signal. For example, the reference ESL radio 860 may transmit the beacon signal 861. In another example implementation, the plurality of location offsets comprise a linear progression of distances corresponding to a plurality of time durations. For example, the message may provide information for Equation (2). In another example implementation, the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device. For example, the message (e.g., the beacon signal 950) may indicate offsets for, and only for, the subset 920 of ESL radios. In another example implementation, the apparatus comprises the first anchor wireless-signal transmitter, and wherein the method 1200 further comprises transmitting, from the first anchor wireless-signal transmitter, a first beacon signal more frequently than another anchor wireless-signal transmitter that is proximate to at least one of, but not included in, the plurality of second anchor wireless-signal transmitters transmits a second beacon signal. For example, the ESL radio 921 (and possibly the radios 922-927) may beacon more frequently (more often) than one or more of the ESL radios 910 outside of the subset 920. The processor 610, possibly in combination with the memory 630, in combination with the transceiver 620 (e.g., the wireless transmitter 642 and the antenna 646) may comprise means for transmitting the first beacon signal more frequently than another anchor wireless-signal transmitter. In another example implementation, the message includes at least one offset correction corresponding to at least one of the plurality of second anchor wireless-signal transmitters. For example, the beacon signal 1022 may indicate one or more corrections to one or more location offsets and/or the beacon signal 1032 may indicate a correction to a location offset for the radio 1030, e.g., a correction to an offset indicated by the beacon signal 1022 for the radio 1030. In a further example implementation, the message includes a bitmap indicating for which of the plurality of second anchor wireless-signal transmitters the message includes a respective offset correction. For example, the beacon signal 1022 may include a bitmap (e.g., "0100") indicating which follower radios have applicable correction factors (e.g., provided in the beacon signal 1022 and/or provided by the beacon signal(s) of the respective follower radio(s)), if the radio 1020 knows of any follower radios to have correction factors applied (whether the radio 1020 knows the correction factor values or not).

Also or alternatively, implementations of the method 1200 may include one or more of the following features. In an example implementation, the apparatus comprises the particular second anchor wireless-signal transmitter, and the message comprises a beacon signal. For example, a follower radio such as the radio 865 may transmit an location offset for the location of the follower radio relative to a lead radio, e.g., in the beacon signal 866. In another example implementation, the message further indicates a time, a frequency, or a combination thereof, for each of the plurality of second wireless-signal transmissions. For example, a location offset may include a time window, or a frequency range, or a combination thereof (e.g., one or more OFDM resource elements each comprising an OFDM symbol and a subcarrier).

IMPLEMENTATION EXAMPLES

Implementation examples are provided in the following numbered clauses.

Clause 1. An apparatus comprising:
- at least one transceiver;
- at least one memory; and
- at least one processor, communicatively coupled to the at least one transceiver and the at least one memory, configured to transmit, via the at least one transceiver to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

Clause 2. The apparatus of clause 1, wherein the message indicates a plurality of location offsets relative to the reference location, and wherein each of the plurality of location offsets corresponds to a respective second anchor wireless-signal transmitter of the plurality of second anchor wireless-signal transmitters.

Clause 3. The apparatus of clause 2, wherein the message indicates the reference location.

Clause 4. The apparatus of clause 3, wherein the apparatus comprises the first anchor wireless-signal transmitter, and the message comprises a beacon signal.

Clause 5. The apparatus of clause 2, wherein the plurality of location offsets comprise a linear progression of distances corresponding to a plurality of time durations.

Clause 6. The apparatus of clause 2, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

Clause 7. The apparatus of clause 6, wherein the apparatus comprises the first anchor wireless-signal transmitter, and wherein the first anchor wireless-signal transmitter is configured to transmit a first beacon signal more frequently than another anchor wireless-signal transmitter that is proximate to at least one of, but not included in, the plurality of second anchor wireless-signal transmitters transmits a second beacon signal.

Clause 8. The apparatus of clause 2, wherein the message includes at least one offset correction corresponding to at least one of the plurality of second anchor wireless-signal transmitters.

Clause 9. The apparatus of clause 8, wherein the message includes a bitmap indicating for which of the plurality of second anchor wireless-signal transmitters the message includes a respective offset correction.

Clause 10. The apparatus of clause 1, wherein the apparatus comprises the particular second anchor wireless-signal transmitter, and the message comprises a beacon signal.

Clause 11. The apparatus of clause 1, wherein the message further indicates a time, a frequency, or a combination thereof, for each of the plurality of second wireless-signal transmissions.

Clause 12. A method, for use in positioning a target mobile device, comprising:

transmitting, to the target mobile device from an apparatus, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

Clause 13. The method of clause 12, wherein the message indicates a plurality of location offsets relative to the reference location, and wherein each of the plurality of location offsets corresponds to a respective second anchor wireless-signal transmitter of the plurality of second anchor wireless-signal transmitters.

Clause 14. The method of clause 13, wherein the message indicates the reference location.

Clause 15. The method of clause 14, wherein the apparatus comprises the first anchor wireless-signal transmitter, and the message comprises a beacon signal.

Clause 16. The method of clause 13, wherein the plurality of location offsets comprise a linear progression of distances corresponding to a plurality of time durations.

Clause 17. The method of clause 13, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

Clause 18. The method of clause 17, wherein the apparatus comprises the first anchor wireless-signal transmitter, and wherein the method further comprises transmitting, from the first anchor wireless-signal transmitter, a first beacon signal more frequently than another anchor wireless-signal transmitter that is proximate to at least one of, but not included in, the plurality of second anchor wireless-signal transmitters transmits a second beacon signal.

Clause 19. The method of clause 13, wherein the message includes at least one offset correction corresponding to at least one of the plurality of second anchor wireless-signal transmitters.

Clause 20. The method of clause 19, wherein the message includes a bitmap indicating for which of the plurality of second anchor wireless-signal transmitters the message includes a respective offset correction.

Clause 21. The method of clause 12, wherein the apparatus comprises the particular second anchor wireless-signal transmitter, and the message comprises a beacon signal.

Clause 22. The method of clause 12, wherein the message further indicates a time, a frequency, or a combination thereof, for each of the plurality of second wireless-signal transmissions.

Clause 23. An apparatus comprising:

at least one transceiver; and means for transmitting, to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

Clause 24. The apparatus of clause 23, wherein the message indicates a plurality of location offsets relative to the reference location, and wherein each of the plurality of location offsets corresponds to a respective second anchor wireless-signal transmitter of the plurality of second anchor wireless-signal transmitters.

Clause 25. The apparatus of clause 24, wherein the message indicates the reference location.

Clause 26. The apparatus of clause 25, wherein the apparatus comprises the first anchor wireless-signal transmitter, and the message comprises a beacon signal.

Clause 27. The apparatus of clause 24, wherein the plurality of location offsets comprise a linear progression of distances corresponding to a plurality of time durations.

Clause 28. The apparatus of clause 24, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

Clause 29. The apparatus of clause 28, wherein the apparatus comprises the first anchor wireless-signal transmitter, and wherein the apparatus further comprises means for transmitting a first beacon signal more frequently than another anchor wireless-signal transmitter that is proximate to at least one of, but not included in, the plurality of second anchor wireless-signal transmitters transmits a second beacon signal.

Clause 30. The apparatus of clause 24, wherein the message includes at least one offset correction corresponding to at least one of the plurality of second anchor wireless-signal transmitters.

Clause 31. The apparatus of clause 30, wherein the message includes a bitmap indicating for which of the plurality of second anchor wireless-signal transmitters the message includes a respective offset correction.

Clause 32. The apparatus of clause 23, wherein the apparatus comprises the particular second anchor wireless-signal transmitter, and the message comprises a beacon signal.

Clause 33. The apparatus of clause 23, wherein the message further indicates a time, a frequency, or a combination thereof, for each of the plurality of second wireless-signal transmissions.

Clause 34. A non-transitory, processor-readable storage medium comprising processor-readable instructions to cause at least one processor of an apparatus to:

transmit, to a target mobile device, a message indicating a location offset relative to a reference location of a first anchor wireless-signal transmitter that corresponds to a first wireless-signal transmission, the location offset corresponding to a particular second anchor wireless-signal transmitter of a plurality of second anchor wireless-signal transmitters that correspond to a plurality of second wireless-signal transmissions.

Clause 35. The non-transitory, processor-readable storage medium of clause 34, wherein the message indicates a plurality of location offsets relative to the reference location, and wherein each of the plurality of location offsets corresponds to a respective second anchor wireless-signal transmitter of the plurality of second anchor wireless-signal transmitters.

Clause 36. The non-transitory, processor-readable storage medium of clause 35, wherein the message indicates the reference location.

Clause 37. The non-transitory, processor-readable storage medium of clause 36, wherein the apparatus comprises the first anchor wireless-signal transmitter, and the message comprises a beacon signal.

Clause 38. The non-transitory, processor-readable storage medium of clause 35, wherein the plurality of location offsets comprise a linear progression of distances corresponding to a plurality of time durations.

Clause 39. The non-transitory, processor-readable storage medium of clause 35, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

Clause 40. The non-transitory, processor-readable storage medium of clause 39, wherein the apparatus comprises the first anchor wireless-signal transmitter, and wherein the non-transitory, processor-readable storage medium further comprises processor-readable instructions to cause the at least one processor to transmit a first beacon signal more frequently than another anchor wireless-signal transmitter that is proximate to at least one of, but not included in, the plurality of second anchor wireless-signal transmitters transmits a second beacon signal.

Clause 41. The non-transitory, processor-readable storage medium of clause 35, wherein the message includes at least one offset correction corresponding to at least one of the plurality of second anchor wireless-signal transmitters.

Clause 42. The non-transitory, processor-readable storage medium of clause 41, wherein the message includes a bitmap indicating for which of the plurality of second anchor wireless-signal transmitters the message includes a respective offset correction.

Clause 43. The non-transitory, processor-readable storage medium of clause 34, wherein the apparatus comprises the particular second anchor wireless-signal transmitter, and the message comprises a beacon signal.

Clause 44. The non-transitory, processor-readable storage medium of clause 34, wherein the message further indicates a time, a frequency, or a combination thereof, for each of the plurality of second wireless-signal transmissions.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:

at least one transceiver;

at least one memory; and at least one processor, communicatively coupled to the at least one transceiver and the at least one memory, configured to transmit, via the at least one transceiver to a target mobile device, a message indicating a plurality of location offsets relative to a reference location of a first anchor wireless-signal transmitter that corresponds to a first wireless-signal transmission, each of the plurality of location offsets corresponding to a respective second anchor wireless-signal transmitter of a plurality of second anchor wireless-signal transmitters that correspond to a plurality of second wireless-signal transmissions;

wherein the message includes:

at least one offset correction corresponding to at least one of the plurality of second anchor wireless-signal transmitters, and a bitmap indicating for which of the plurality of second anchor wireless-signal transmitters the message includes a respective offset correction.

2. The apparatus of claim 1, wherein the message indicates the reference location.

3. The apparatus of claim 2, wherein the apparatus comprises the first anchor wireless-signal transmitter, and the message comprises a beacon signal.

4. The apparatus of claim 1, wherein the plurality of location offsets comprise a linear progression of distances corresponding to a plurality of time durations.

5. The apparatus of claim 1, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

6. The apparatus of claim 5, wherein the apparatus comprises the first anchor wireless-signal transmitter, and wherein the first anchor wireless-signal transmitter is configured to transmit a first beacon signal more frequently than another anchor wireless-signal transmitter that is not included in, the plurality of second anchor wireless-signal transmitters transmits a second beacon signal.

7. The apparatus of claim 1, wherein the apparatus comprises at least one second anchor wireless-signal transmitter, and the message comprises a beacon signal.

8. The apparatus of claim 1, wherein the message further indicates a time, a frequency, or a combination thereof, for each of the plurality of second wireless-signal transmissions.

9. A method, for use in positioning a target mobile device, comprising:

transmitting, to the target mobile device from an apparatus, a message indicating a plurality of location offsets relative to a reference location of a first anchor wireless-signal transmitter that corresponds to a first wireless-signal transmission, each of the plurality of location offsets corresponding to a respective second anchor wireless-signal transmitter of a plurality of second anchor wireless-signal transmitters that correspond to a plurality of second wireless-signal transmissions;

wherein the message includes:

at least one offset correction corresponding to at least one of the plurality of second anchor wireless-signal transmitters, and a bitmap indicating for which of the plurality of second anchor wireless-signal transmitters the message includes a respective offset correction.

10. The method of claim 9, wherein the message indicates the reference location.

11. The method of claim 10, wherein the apparatus comprises the first anchor wireless-signal transmitter, and the message comprises a beacon signal.

12. The method of claim 9, wherein the plurality of location offsets comprise a linear progression of distances corresponding to a plurality of time durations.

13. The method of claim 9, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

14. The method of claim 13, wherein the apparatus comprises the first anchor wireless-signal transmitter, and wherein the method further comprises transmitting, from the first anchor wireless-signal transmitter, a first beacon signal more frequently than another anchor wireless-signal transmitter that is not included in, the plurality of second anchor wireless-signal transmitters transmits a second beacon signal.

15. The method of claim 9, wherein the apparatus comprises at least one second anchor wireless-signal transmitter, and the message comprises a beacon signal.

16. The method of claim 9, wherein the message further indicates a time, a frequency, or a combination thereof, for each of the plurality of second wireless-signal transmissions.

17. An apparatus comprising:

at least one transceiver; and means for transmitting, to a target mobile device, a message indicating a plurality of location offsets relative to a reference location of a first anchor wireless-signal transmitter that corresponds to a first wireless-signal transmission, each of the plurality of location offsets corresponding to a respective second anchor wireless-signal transmitter of a plurality of second anchor wireless-signal transmitters that correspond to a plurality of second wireless-signal transmissions;

wherein the message includes:

at least one offset correction corresponding to at least one of the plurality of second anchor wireless-signal transmitters, and a bitmap indicating for which of the plurality of second anchor wireless-signal transmitters the message includes a respective offset correction.

18. The apparatus of claim 17, wherein the message indicates the reference location.

19. The apparatus of claim 18, wherein the apparatus comprises the first anchor wireless-signal transmitter, and the message comprises a beacon signal.

20. The apparatus of claim 17, wherein the plurality of location offsets comprise a linear progression of distances corresponding to a plurality of time durations.

21. The apparatus of claim 17, wherein the message is associated with the target mobile device, and wherein every one of the plurality of location offsets in the message corresponds to a second location, of a corresponding one of the plurality of second anchor wireless-signal transmitters, that is within a threshold distance of a coarse location of the target mobile device.

22. The apparatus of claim 21, wherein the apparatus comprises the first anchor wireless-signal transmitter, and wherein the apparatus further comprises means for transmitting a first beacon signal more frequently than another anchor wireless-signal transmitter that is not included in, the plurality of second anchor wireless-signal transmitters transmits a second beacon signal.

23. A non-transitory, processor-readable storage medium comprising processor-readable instructions to cause at least one processor of an apparatus to:

transmit, to a target mobile device, a message indicating a plurality of location offsets relative to a reference location of a first anchor wireless-signal transmitter that corresponds to a first wireless-signal transmission, each of the plurality of location offsets corresponding to a respective second anchor wireless-signal transmitter of a plurality of second anchor wireless-signal transmitters that correspond to a plurality of second wireless-signal transmissions;

wherein the message includes:

at least one offset correction corresponding to at least one of the plurality of second anchor wireless-signal transmitters, and a bitmap indicating for which of the plurality of second anchor wireless-signal transmitters the message includes a respective offset correction.

* * * * *